United States Patent [19]
Singh et al.

[11] Patent Number: 6,005,999
[45] Date of Patent: Dec. 21, 1999

[54] WAVEGUIDE NARROWBAND REJECTION FILTER

[75] Inventors: Harmeet Singh, Tarriffville, Conn.; Charles W. Haggans; Wayne F. Varner, both of Woodbury, Minn.

[73] Assignee: 3M Innovative Properties Company, Minneapolis, Minn.

[21] Appl. No.: 08/975,843

[22] Filed: Nov. 21, 1997

[51] Int. Cl.[6] .............................. G02B 6/34; G02B 6/22
[52] U.S. Cl. .............................. 385/37; 385/27; 385/127
[58] Field of Search .............................. 385/15, 27, 28, 385/31, 37, 127

[56] References Cited

U.S. PATENT DOCUMENTS

| | | | |
|---|---|---|---|
| 5,042,897 | 8/1991 | Meltz et al. | 385/37 |
| 5,570,440 | 10/1996 | Mizrahi | 385/37 |
| 5,740,292 | 4/1998 | Strasser | 385/37 |
| 5,805,751 | 9/1998 | Kewitsch et al. | 385/43 |

FOREIGN PATENT DOCUMENTS

| | | | |
|---|---|---|---|
| 0 767 391 A2 | 4/1997 | European Pat. Off. | G02B 6/16 |
| 0 793 123 A1 | 9/1997 | European Pat. Off. | G02B 6/16 |

OTHER PUBLICATIONS

T. Erdogan and J. E. Sipe, "Radiation–mode Coupling Loss In Tilted Fiber Phase Gratings," in Fiber Phase Gratings: Optics Letters, vol. 20, No. 18, Sep. 15, 1995, (Optical Society of America, 1995), pp. 1838–1840.

L. Dong, L. Reekie and J.L. Cruz, "Long Period Gratings Formed in Depressed Cladding Fibres," in Bragg Gratings, Electronics Letters, Oct. 23rd, 1997, vol. 33, No. 22, pp. 1897–1898.

S.J. Hewlett, J.D. Love, G. Meltz, T.J. Bailey and W. W. Morey, "Coupling Characteristics of Photo–Induced Bragg Gratings In Depressed– and Matched–Cladding Fibre,"Optical and Quantum Electronics 28, (1996), pp. 1641–1654.

Yu Liu, et al., "Analysis of Long–period and Short–period Fiber Bragg Gratings by Phase Matching Condition", SPIE vol. 2893, pp. 441–448.

"Long Period Gratings Formed in Depressed Cladding Fibres", by Liang Dong et al., Optoelectronics Research Centre, The University of Southampton, UK, Bragg Gratings, Photoitsensitivity, and Poling in Glass Fibers and Waveguides: Applications and Fundamentals, vol. 17, OSA Technical Digest Series, BMG17–1 through 4, pp. 234–237.

(List continued on next page.)

*Primary Examiner*—John D. Lee
*Assistant Examiner*—Victoria D. Hao
*Attorney, Agent, or Firm*—Nestor F. Ho

[57] ABSTRACT

An optical fiber filter including a length of single mode fiber having an operating wavelength $\lambda_0$. Fiber designs may include a depressed inner clad fiber, a photosensitive matched inner clad fiber or a photosensitive depressed inner clad fiber. The length of fiber includes a core, an inner cladding, an outer cladding and an azimuthally asymmetric grating. The core allows the existence of a $LP_{01}$ core mode having an effective index of $n_{eff,01}$ and the cladding allows the existence of a $LP_{1m}$ cladding mode, $m \geq 1$. The core has an index of refraction $n_{co}$ and a radius A. The inner cladding has an index of refraction $n_{ic}$, an inner radius A, an outer radius AB, a thickness W, where W=AB−A, and a refraction difference $\Delta n-$, where $\Delta n-$ is the difference between $n_{ic}$ and $n_{oc}$ and $n_{co} > n_{oc} > n_{ic}$. The inner cladding may be photosensitive to a radius $R_{grat}$ and have a fractional photosensitivity $\gamma$. The outer cladding generally laterally surrounds the inner cladding and has an inner radius AB, an outer radius B, and an index of refraction $n_{oc}$, where $\Delta n_+$ is the difference between $n_{co}$ and $n_{oc}$. The grating has an effective tilt angle $\theta$ and a period ($\Lambda$), where $\Lambda \leq (\lambda_0 \cos \theta)/(2n_{eff,01})$, the maximum relative coupling coefficient for the cladding mode max($RCC_{1m}$) being greater or equal to 0.2 and the ratio of peak reflectivities for the cladding mode and the core mode RR being greater or equal to 1.

19 Claims, 13 Drawing Sheets

OTHER PUBLICATIONS

"Non–reflecting Narrow–band Fiber Optical Fabry–Perot Transmission Filter", by Dietmar Johlen et al., Technische Universitat Hamburg, Germany, Bragg Gratings, Photosensitivity, and Poling in Glass Fibers and Waveguides: Applications and Fundamentals, vol. 17, OSA Technical Digest Series, pp. BSuC5–1/42 through BSuC5–3/44.

"Strong $LP_{11}$–Mode Splitting in UV Side–Written Tilted Fiber Gratings", by Dietmar Johlen et al., Technische Universitat Hamburg, Germany, Bragg Gratings, Photosensitivity, and Poling in Glass Fibers and Waveguides: Applications and Fundamentals, vol. 17, OSA Technical Digest Series, pp. BMG12–1/219 through BMG12–3/221.

"Reflective–mode Conversion with UV–induced Phase Gratings in Two–mode Fiber" by Thomas A. Strasser et al., Bell Laboratories, Lucent Technologies, Murray Hill, New Jersey, *OFC '97 Technical Digest*, Friday Morning, FB3, pp. 348–349.

WAVEGUIDE NARROWBAND REJECTION FILTER

BACKGROUND OF THE INVENTION

1. Field of the Invention

The present invention relates generally to a narrowband rejection filter including a waveguide having an azimuthally asymmetric grating. More specifically, the present invention is directed to a single-mode depressed inner clad, photosensitive matched inner clad or photosensitive depressed inner clad optical fiber design having an azimuthally asymmetric photoinduced Bragg grating that couples out of a forward propagating $LP_{01}$ core mode over a narrow wavelength band while practically suppressing backreflection. The present invention further relates to system applications of the novel filter design.

2. Description of Related Art

An optical fiber typically includes a core region of refractive index $n_{co}$ or $n_1$. In double clad fiber designs, the core region is surrounded with an inner cladding having a refractive index $n_{ic}$ or $n_{1a}$, which is in turn surrounded by an outer cladding region having a refractive index $n_{oc}$ or $n_2$. The outer cladding is surrounded by an external medium having a refractive index $n_{ext}$. A region of the fiber may be photosensitive.

The free parameters in double cladding waveguide designs are defined as follows:

MFD operational mode field diameter $\lambda_o$ operational wavelength $\lambda_c$ second mode cutoff wavelength A, $r_{co}$ core radius generated from a single effective step approximation of the core region W inner cladding width generated from a single effective step approximation of the inner cladding region B, $r_{oc}$ outer cladding radius $n_{co}$, $n_1$ core refractive index generated from a single effective step approximation of the core region $n_{ic}$, $n_{1a}$ inner cladding refractive index generated from a single step approximation of the inner cladding region $n_{oc}$, $n_2$ outer cladding refractive index $n_{ext}$ external medium refractive index $R_{grat}$ maximum radius of photosensitive region of the fiber $\gamma$ fractional photosensitivity of photosensitive inner cladding as compared to the core, $\gamma$=(grating strength in cladding)/(grating strength in core). (For example, $\gamma$=1 means equal photosensitivity in core and inner cladding.)

"Grating tilt angle" is defined as the angle between the grating vector (the direction normal to the planes which define the grating periodicity) and the longitudinal axis of the fiber, where a physical tilt of the grating planes exists in the fiber.

"Effective grating tilt angle" is defined as the value of "grating tilt angle" that is shown experimentally to give cladding-mode loss equivalent to the cladding-mode loss when an azimuthal asymmetry other than a physical tilt of the grating fringes is present in a grating inscribed in the waveguide.

"Fundamental rejection notch" is defined to be the feature or dip in the transmission spectrum of the waveguide grating with the smallest value of transmission. Generally, this corresponds to the wavelength for which a reduction in the transmitted signal is desired.

"Cladding mode losses" refers to losses or dips in the observed transmission spectrum for a waveguide containing a grating that occur due to coupling of the forward propagating modes of the waveguide to counter-propagating bound cladding modes (in the case of $n_{ext} < n_{oc}$), or counter-propagating radiation modes (in the case of $n_{ext} \geq n_{oc}$). Peak cladding mode loss ("PCML") is the maximum "cladding mode loss" in a given transmission spectrum for a waveguide containing a grating.

A passive component that couples light out of the forward propagating $LP_{01}$ core mode of a single-mode telecommunications fiber with relatively negligible backreflection over a narrow wavelength band is a critical filtering element for lightwave systems in which no backreflected signal can be tolerated.

The standard approach to filtering has been to couple the forward propagating $LP_{01}$ mode to a counter propagating $LP_{01}$ mode. Conventional Bragg gratings redirect the filtered signal back into the fiber. The higher the filtering ability of a traditional Bragg grating, the greater is the back reflection. However, in many systems, such as WDM applications, the back reflection may cause deleterious effects, such as destabilizing the signal emitting laser. Presently, an available alternative is to install isolators, which protect sensitive equipment. However, the current cost of isolators is high.

Work towards obtaining a narrowband rejection filter utilizing a grating in which the loss is not obtained through coupling to the counterpropagating $LP_{01}$ core mode can be broken into two categories: coupling to the $LP_{11}$ mode in a two mode fiber and coupling to cladding or radiation modes in a single-mode fiber.

Suppression of the forward propagating $LP_{01}$ core mode over a narrow wavelength band was shown in a two mode fiber. The backreflected signal at the peak rejection wavelength due to coupling to the counter-propagating $LP_{11}$ core mode was measured to be −15 dB, a value smaller than the commonly desired isolation for wavelength division multiplexing applications. In addition, two-mode fiber filters may have higher insertion losses than filters in single-mode fiber due to an imperfect mode-field match. Standard telecommunications fibers usually are single mode fibers.

Attempts towards suppression of the core mode using single mode fibers have discussed how in a strong, tilted grating, significant coupling to the $LP_{1m}$ modeset could occur. Additionally, outcoupling light from a single-mode fiber utilizing a transversely asymmetrically shaped Bragg grating has been attempted. However, these attempts have failed to couple a significant fraction of power from the fundamental mode.

The need remains for a filter design that allows for coupling out of the $LP_{01}$ core mode with near, if not complete, suppression of coupling to the backward propagating fundamental mode.

SUMMARY OF THE INVENTION

The present invention offers a narrowband rejection filter that couples out of a forward propagating $LP_{01}$ core mode having negligible backreflection. The filter includes a single mode waveguide, such as length of single mode fiber, having an operating wavelength $\lambda_o$. The fiber includes a core having an index of refraction $n_{co}$ and a radius A, the core having an $LP_{01}$ core mode with an effective index of $n_{eff,01}$. The fiber design may include a depressed inner cladding design, a photosensitive matched inner cladding design, or a photosensitive depressed inner cladding design.

In a depressed inner cladding (DIC) embodiment, the core is laterally surrounded by a depressed inner cladding having an index of refraction $n_{ic}$, an inner radius A, an outer radius AB, and an inner depressed cladding width W, where W=AB−A. The inner cladding in turn is laterally surrounded by an outer cladding having an inner radius AB, an outer radius B, and an index of refraction $n_{oc}$. $\Delta n_+$ is the difference between $n_{co}$ and $n_{oc}$, $\Delta n-$ is the difference between $n_{ic}$ and $n_{oc}$ and $n_{co} > n_{oc} > n_{ic}$. The values of $\Delta n_+$, $\Delta n-$, and W allow the existence of a $LP_{1m}$ cladding mode, $m \geq 1$.

In an alternate photosensitive matched inner cladding (PMIC) embodiment, $\Delta n-$ is zero and a photosensitive cladding region extends to a radius $R_{grat}$. The photosensitive region may extend into both the inner cladding and the outer cladding. The photosensitivity of the photosensitive cladding region is a fraction $\gamma$ of the photosensitivity of the core region.

In an alternate photosensitive depressed inner cladding (PDIC) embodiment, $\Delta n-$ is nonzero and a photosensitive cladding region extends to a radius $R_{grat}$. The photosensitivity of the photosensitive cladding region is a fraction $\gamma$ of the photosensitivity of the core region. $R_{grat}$ may exceed AB, giving photosensitivity in both the barrier region and in the outer cladding region, that is, the photosensitive cladding region may comprise both the inner cladding and at least a portion of the outer cladding.

An azimuthally asymmetric grating having an effective tilt angle $\theta$ and a period ($\Lambda$), where $\Lambda$ is less than or equal to approximately $(\lambda_0 \cos\theta)/(2n_{eff,01})$ (to effect coupling to only counterpropagating bound or lossy cladding modes and counterpropagating core modes) is written in the photosensitive region of the fiber.

More accurately, $\Lambda \leq (\lambda_0 \cos\theta)/(2n_{eff,01}')$, where $n_{eff,01}'$ is the effective index of the core mode in the grating region, including the effect of any uniform unmodulated index change introduced during the grating writing process which may cause $n_{eff,01}'$ to differ from $n_{eff,01}$. In all equations that follow, the value of $n_{eff,01}$ is defined such that $n_{eff,01} \equiv n_{eff,01}'$.

The maximum relative coupling coefficient for the cladding mode, max($RCC_{1m}$), for $1 \leq m \leq 30$, is greater or equal to 0.2 and the ratio of peak reflectivities for the cladding mode and the core mode, RR, is greater or equal to 1. Preferably, RR>3. As a result, the peak reflectivity of the core mode is less or equal to one third of the peak reflectivity of the cladding mode.

In alternative embodiments $1° < \theta < 10°$ and the grating may comprises a chirped grating. In a preferred embodiment, 1250 nm<$\lambda_0$<1600 nm, B≈62.5 μm, W>0.6 A, $\Delta n-$>0.003, 4 μm<MFD<13 μm, 0.003<$\Delta n_+$<0.012, and 2 μm<A<8 μm. In another preferred embodiment 800 nm<$\lambda_0$<1000 nm, B≈62.5 μm, W>0.6 A, $\Delta n-$>0.003, 2 μm<MFD<30 μm, 0.003<$\Delta n_+$<0.012, and 1 μm<A<8μm.

In another preferred embodiment, 1250 nm<$\lambda_0$<1600 nm, B≈62.5 μm, $\Delta n-$=0, $R_{grat}$>1.5 A, $\gamma$>0.5, 4 μm<MFD<13 μm, 0.003<$\Delta n_+$<0.012, and 2 μm<A<8 μm. In another preferred embodiment, 800 nm<$\lambda_0$<1000 nm, B≈62.5 μm, $\Delta n-$=0, $R_{grat}$>1.5 A, $\gamma$>0.5, 2 μm<MFD<30 μm, 0.003<$\Delta n_+$<0.012, and 1 μm<A<8 μm.

In yet another preferred embodiment, 1250 nm<$\lambda_0$<1600 nm, B≈62.5 μm, W>0.6 A, $\Delta n-$>0.003, $R_{grat}$>1.5 A, $\gamma$>0.5, 4 μm<MFD <13 μm, 0.003<$\Delta n_+$<0.012, and 2 μm<A<8 μm. In another preferred embodiment, 800 nm<$\lambda_0$<1000 nm, B≈62.5 μm, W>0.6 A, $\Delta n-$>0.003, $R_{grat}$>1.5 A, $\gamma$>0.5, 2 μm<MFD <30 μm, 0.003<$\Delta n_+$<0.012, and 1 μm<A<8 μm.

The filter described above, may be used to manufacture a bandpass filter, a test signal suppresser, or gain flattening device. Additionally, the filter described above may be tuned, either in strength, center rejection wavelength, or other optical properties, through optical, mechanical, thermal, electrical, or other means to form tunable, reconfigurable, or switchable filters.

BRIEF DESCRIPTION OF THE DRAWINGS

FIG. 9 is a graphical plot of the reflection spectrum versus wavelength for the grating which was the subject of FIG. 8a.

DETAILED DESCRIPTION OF THE INVENTION

Figure 1A:
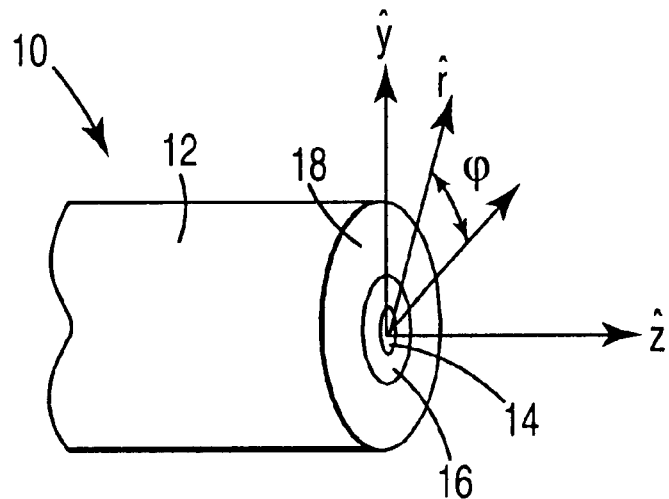
FIG. 1(a)–(b) are perspective and side views respectively of an optical fiber in accordance with the present invention detailing the fiber Bragg grating geometry coordinate system and grating tilt angle definition.

A simplified illustration of a filter 10 in accordance with the present invention is illustrated in FIG. 1. The present invention comprises a narrowband rejection filter that couples out of a forward propagating $LP_{01}$ core mode having negligible backreflection. The filter 10 includes a single mode waveguide, shown in FIG. 1 as a length of single mode fiber 12, having an operating wavelength $\lambda_0$.

The optical fiber 12 includes a photosensitive core 14 having a first transverse dimension or diameter 2A, a radius A (or $r_{co}$) and being comprised of a material having a refractive index $n_{co}$ or $n_1$. The core 14 has an $LP_{01}$ core mode with an effective index of $n_{\it{eff},01}$. Laterally surrounding the core 14 is an inner cladding 16 having an inner cladding or barrier radius AB (or $r_{ic}$). The fiber 12 may be a depressed inner cladding design, a photosensitive matched inner cladding design, or a photosensitive depressed inner cladding design. The inner cladding 16 has a refractive index $n_{ic}$ or $n_{1a}$. For photosensitive designs, the inner cladding 16, and possibly even the outer cladding, includes a photosensitive region (see FIGS. 2b and 2c) that extends to a radius $R_{grat}$, where the photosensitivity of the cladding photosensitivity region is a fraction $\gamma$ of the photosensitivity of the core 14.

An outer cladding 18, having a refractive index $n_{oc}$ or $n_2$ and a radius B (or $r_{oc}$) laterally surrounds the inner cladding 16. The outer cladding 18 likewise is surrounded by an external medium having a refractive index $n_{ext}$.

Figure 1B:
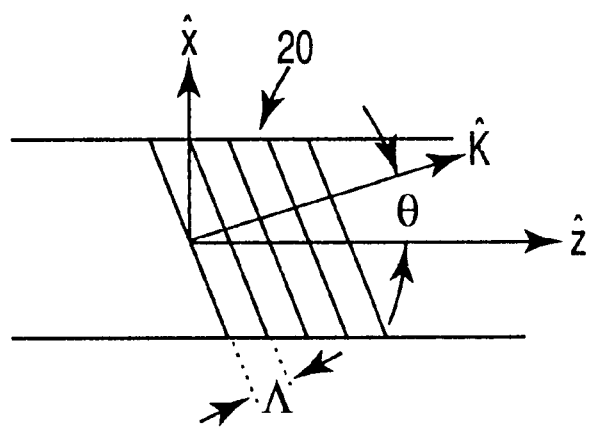

FIGS. 1a and 1b also illustrate the Bragg grating geometry coordinate system definitions. A longitudinal optical axis z is defined by the center axis of the fiber 10. The optical fiber 12 is a single-mode uncoated optical fiber having a cylindrical cross-section. It is to be understood that other embodiments of the present invention may include fibers with coatings and fibers having different cross-sectional geometries known in the art.

FIG. 1b illustrates an azimuthally asymmetric Bragg grating 20 having an effective tilt angle $\theta$ and a period ($\Lambda$), where $\Lambda$ is less than or equal to approximately ($\lambda_0 \cos \theta$)/($2n_{\it{eff},01}$) (to effect coupling to only counterpropagating bound or lossy cladding modes and counterpropagating core modes) written in the photosensitive region of the fiber 12. The fiber 12 may be subject to hydrogen loading or other processes known in the art to facilitate the writing of the grating. Due to the grating manufacturing process, the fiber 12 includes a grating process azimuthal asymmetry.

More accurately, $\Lambda \leq (\lambda_0 \cos \theta)/(2n_{\it{eff},0,1}')$, where $n_{\it{eff},0,1}'$ is the effective index of the core mode in the grating region, including the effect of any uniform unmodulated index change introduced during the grating writing process which may cause $n_{\it{eff},01}'$ to differ from $n_{\it{eff},01}$. In the present description, the value of $n_{\it{eff},01}$ takes into account these unmodulated index change effects.

FIG. 2 illustrates the radial distribution of refractive indices for three embodiments of a fiber in accordance with the present invention. The n value boundaries in FIG. 2 are simplified as discrete and instantaneous "effective step index" approximations. In FIG. 2, $n_{ext} < n_{oc}$ (or $n_2$). However, FIG. 2 is not meant to limit values of $n_{ext}$, as in functional filters, $n_{ext}$ may exceed $n_{oc}$.

Figure 2A:
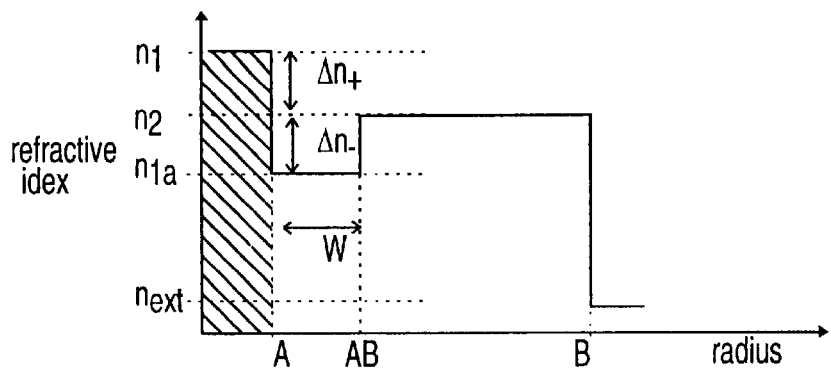
FIGS. 2(a)–(c) are graphical representations of the radial distribution of refractive index for different embodiments of the present invention.

FIG. 2a illustrates the radial refractivity profile of a depressed inner cladding (DIC) fiber. In the DIC fiber, the refractive index of the core $n_{co}$ has a greater absolute value than the refractive index of the outer cladding $n_{oc}$. In turn, the refractive index of the outer cladding has a greater absolute value than the refractive index of the inner cladding $n_{ic}$. Accordingly, $$n_{co} > n_{oc} > n_{ic}$$

The difference between $n_{co}$ and $n_{ic}$ creates a refractive index profile depressed well of width W, where W=AB−A, and of depth $\Delta n-$, where $\Delta n- = n_{oc} - n_{ic}$. The difference between $n_{co}$ and $n_{oc}$ is defined as $\Delta n_+$. The total height of the core refractive index profile, $\Delta n$, equals $n_{co} - n_{ic} = \Delta n- + \Delta n_+$.

Figure 2B:
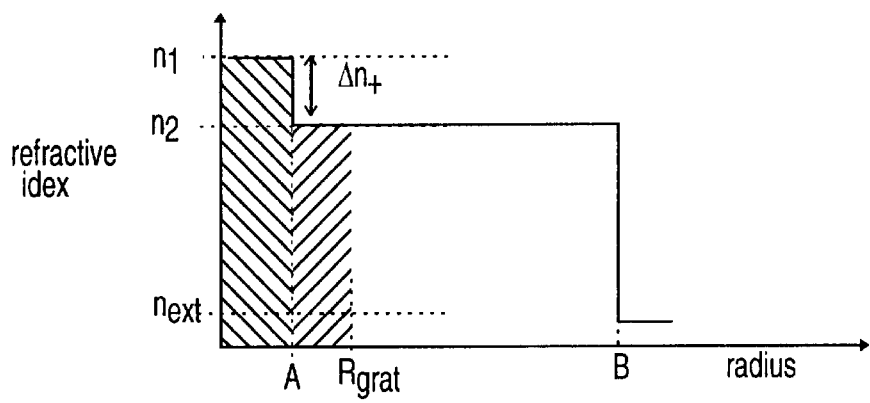

FIG. 2b illustrates the profile of a photosensitive matched inner cladding (PMIC) fiber. In the PMIC embodiment, $\Delta n-$ is zero and the photosensitive cladding region extends to a radius $R_{grat}$, where the photosensitivity of the photosensitive cladding region is a fraction $\gamma$ of the photosensitivity of the core region. In this embodiment, the Bragg grating pattern 20 may be written on both the core and on the photosensitive portion of the inner cladding.

Figure 2C:
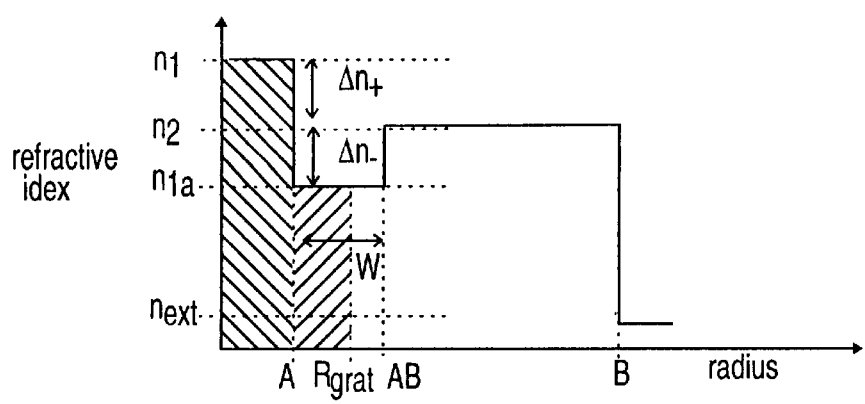

FIG. 2c illustrates the profile of a photosensitive depressed inner cladding (PDIC) fiber. The PDIC embodiment combines the depressed well of the DIC design and the photosensitive region of the PMIC design. $\Delta n-$ is nonzero and the photosensitive cladding region extends to a radius $R_{grat}$, where the photosensitivity of the photosensitive cladding region is a fraction $\gamma$ of the photosensitivity of the core region. The inner depressed cladding has a width W, where W=AB−A, and $R_{grat}$ may exceed AB The present invention allows for effective suppression of coupling to the backward propagating fundamental mode while exhibiting narrowband rejection filtering in transmission. Losses in highly reflective fiber Bragg gratings due to coupling to bound cladding modes or lossy radiation modes have been studied extensively and are undesirable when the fundamental rejection band due to forward propagating $LP_{01}$ to counter-propagating $LP_{01}$ coupling is used for filtering.

However, the fiber design 10 of the present invention includes an azimuthally asymmetric photoinduced grating in the core (and potentially the cladding for cladding photosensitivity) of a fiber with a strongly depressed inner cladding to suppress the forward propagating $LP_{01}$ mode via coupling to a particular $LP_{1m}$ cladding mode. Alternatively, the fiber design 10 may include an azimuthally asymmetric photoinduced grating in the core and cladding of a matched clad fiber. Utilizing a grating having an effective tilt in the selected fiber design, the present invention obtains complete or nearly complete coupling directly to one of the $LP_{11}$ hybrid leaky core modes.

Coupling to the hybrid $LP_{1m}$ mode (commonly called the "ghost" mode) has been observed in a shallow depressed inner clad fiber. Analysis of the observed short-wavelength losses for a tilted grating by comparing measured spectra to the calculated normalized coupling coefficients and resonance locations for the $LP_{0m}$ and $LP_{1m}$ modes confirms the origin of the sharp loss peak ("ghost mode") on the short-wavelength side of the fundamental rejection notch to be due to coupling to an $LP_{1m}$ cladding mode. The strong coupling properties of this mode are due to its hybrid nature. The mode has a field shape similar to the shape the $LP_{11}$ core mode would have in the fiber if it was an allowed mode.

The mechanism for strong coupling to one or a few $LP_{1m}$ modes for the PMIC fiber design is the extension of the grating into the cladding region. Because the grating extends into the grating, the overlap certain $LP_{01}$ and $LP_{1m}$ modes is increased as compared to the equivalent matched clad fiber without cladding photosensitivity.

Coupling between the $LP_{01}$ and $LP_{1m}$ modes is enabled through a physical tilt of the grating fringes or other azimuthally asymmetric grating strength across the core which has a component of the azimuthal symmetry proportional to $\cos \phi$. The coupling may be quantified through the use of a relative coupling coefficient (RCC), which describes the strength of the coupling between the forward propagating $LP_{01}$ core mode and the counter propagating $LP_{1m}$ cladding modes:

$$RCC_{Lm} = RCC_{01,Lm} = \frac{|I_{01,Lm}|}{|I_{01,01}|} \quad (1)$$

with $$I_{01,Lm} = \int_0^{2\pi} \int_0^{R_{grating}} \psi_{01}^*(r)\psi_{Lm}(r,\varphi) f(r,\varphi,\theta) r\, dr\, d\varphi \qquad (2)$$

and $$I_{01,01} = \int_0^{2\pi} \int_0^{A} |\psi_{01}(r)|^2 r\, dr\, d\varphi, \qquad (3)$$

where $f(r,\phi,\theta)$ contains the dependence of the grating on the azimuthal ($\phi$) and radial ($r$) coordinates and the grating tilt angle ($\theta$). In this relation, $\psi_{01}(r,\phi)$ and $\psi_{Lm}(r,\phi)$ are the normalized LP (linearly polarized) solutions for the transverse field distribution in a weakly guiding fiber for the core and cladding modes of interest, respectively. The mode field diameter for the $LP_{01}$ mode is defined using the Petermann definition:

$$MFD = 2\sqrt{2} \left[ \frac{\int_0^\infty |\psi_{01}|^2 r\, dr}{\int_0^\infty \left(\frac{d\psi_{01}}{dr}\right)^2 r\, dr} \right]^{\frac{1}{2}} \qquad (4)$$

The second mode cutoff wavelength, $\lambda_c$, for a particular fiber is defined as the operating wavelength below which propagation of the $LP_{11}$ or $LP_{02}$ core mode is enabled.

Two common azimuthal asymmetries ($f(r,\phi,\theta)$) that are commonly encountered in fiber Bragg gratings are those for grating tilt, $$f(r,\varphi,\theta) = \exp\left(-i\frac{2\pi}{\Lambda} \sin\theta r\cos\varphi\right) \qquad (5)$$

and rating asymmetry due to absorption in the sidewriting process, $$f(r,\varphi,\theta) = \exp\left(-\alpha\left(\sqrt{A^2 - r^2\sin^2\varphi} - r\cos\varphi\right)\right) \qquad (6)$$

assuming linear absorption and linear index mapping with the geometrical parameters as defined in FIGS. 1 and 2. It can be shown that the impact on the $RCC_{1,m}$ values is qualitatively similar for the azimuthal grating asymmetries defined in Eqs. (5) and (6). Thus, for simplicity, in cases where an azimuthal asymmetry such as that due to sidewriting absorption is present in the grating, the effective grating tilt is defined such that, $\theta = \theta_{eff}$, where $\theta_{eff}$ represents the value of $\theta$ that gives cladding-mode loss equivalent to the cladding-mode loss observed with the absorption asymmetry.

Thus, Equation (2) reduces to $$I_{01,Lm} = \int_0^{2\pi} \int_0^{R_{grating}} \psi_{01}^*(r)\psi_{Lm}(r,\varphi)\exp\left(-i\frac{2\pi}{\Lambda}\sin\theta r\cos\varphi\right) r\, dr\, d\varphi \qquad (7)$$

Another parameter that is useful for determining which $LP_{1m}$ cladding mode will exhibit $LP_{11}$ hybrid mode properties is the fractional power contained in the core for the $LP_{Lm}$ mode, $\eta_{Lm}$, which is defined as $$\eta_{Lm} = \frac{\int_0^{2\pi} \int_0^A |\psi_{Lm}(r,\varphi)|^2 r\, dr\, d\varphi}{I_{norm}} \qquad (8)$$

with $$I_{norm} = \int_0^{2\pi} \int_0^\infty |\psi_{Lm}(r,\varphi)|^2 r\, dr\, d\varphi = \left[\frac{1}{2}\left(\frac{\varepsilon_0}{\mu_0}\right)^{\frac{1}{2}} n_1\right]^{-1} \qquad (9)$$

Thus, $\eta_{Lm}$ ranges from 0 to 1, with 1 indicating that all power in the mode is confined to the core of the fiber.

Finally, the solution of the coupled differential equations describing the transfer of power from a forward propagating waveguide mode to a counterpropagating waveguide mode due to a sinusoidal perturbation of the waveguide for the fractional reflected power on resonance is well known to take the form (for an unapodized, unchirped grating)

$$R_{Lm} = \tanh^2(\kappa_{Lm}L) = \tanh^2(C_{Lm}RCC_{Lm}) \qquad (10)$$

In this relation, $$\kappa_{Lm} = \frac{\pi}{\lambda} \Delta n_{modulated} \frac{|I_{01,Lm}|}{I_{norm}} \qquad (11)$$

and $$C_{Lm} = \frac{\pi}{\lambda} \Delta n_{modulated} \frac{|I_{01,01}|}{I_{norm}} L \cong \frac{\pi}{\lambda} \Delta n_{modulated} \eta_{01} L \qquad (12)$$

where the second approximate equality is exact only for $R_{max} = A$, the quantity $\Delta n_{modulated}$ is the amplitude of the sinusoidal grating index modulation, and L is the grating length. Thus, the ratio of peak reflectivities for $LP_{01}$-$LP_{01}$ and $LP_{01}$-$LP_{1m}$ coupling is $$RR = \frac{\tanh^2(C_1 \max(RCC_{1m}))}{\tanh^2(C_1 RCC_{01})}, \quad 1 \leq m \leq 30 \qquad (13)$$

To achieve sufficient coupling, the maximum relative coupling coefficient for the cladding mode $\max(RCC_{1m})$, for $1 \leq m \leq 30$, in the present invention is greater or equal to 0.2 and the ratio of peak reflectivities for the core mode and the cladding mode RR is greater or equal to 1. Preferably, RR>3. As a result, the peak reflectivity of the core mode is less or equal to one third of the peak reflectivity of the cladding mode.

The fiber design process for the depressed inner clad fiber Bragg grating filter of the present invention with or without inner clad photosensitivity comprises two steps: (1) Designing a fiber which has at least one $LP_{1m}$ mode having a significant value of $\eta_{1m}$ and (2) determining the optimum grating tilt for the particular fiber design.

Typically, at the beginning of the single mode DIC fiber design process, the desired operating wavelength of the filter ($\lambda_o$), the cladding radius (B), and the target mode field diameter (MFD) are known. Additionally, it is generally desired to have the second mode cutoff wavelength ($\lambda_c$) to be close to, but less than, the operating wavelength. In optical fibers, $n_2 \approx n_{silica}$ at the design wavelength. These constraints on the fiber design limit the allowed values of A, and $n_1$. Thus, the two fiber parameters that must be determined through the fiber design process are $\Delta n$- ($n_{1a}$) and W (AB).

Since the DIC filter of the present invention operates by coupling to a strongly bound, but leaky $LP_{1m}$ cladding mode, the value of $n_{ext}$ is not crucial for the operation of the fiber and grating combination. However, in the fiber design process, we take $n_{ext}$ to be smaller than $n_2$ by an amount sufficient to allow the existence of greater than 30 $LP_{1m}$ cladding modes. For purposes of comparing to measurements made in air before recoating, we typically choose $n_{ext}=1.0$.

Figure 3A:
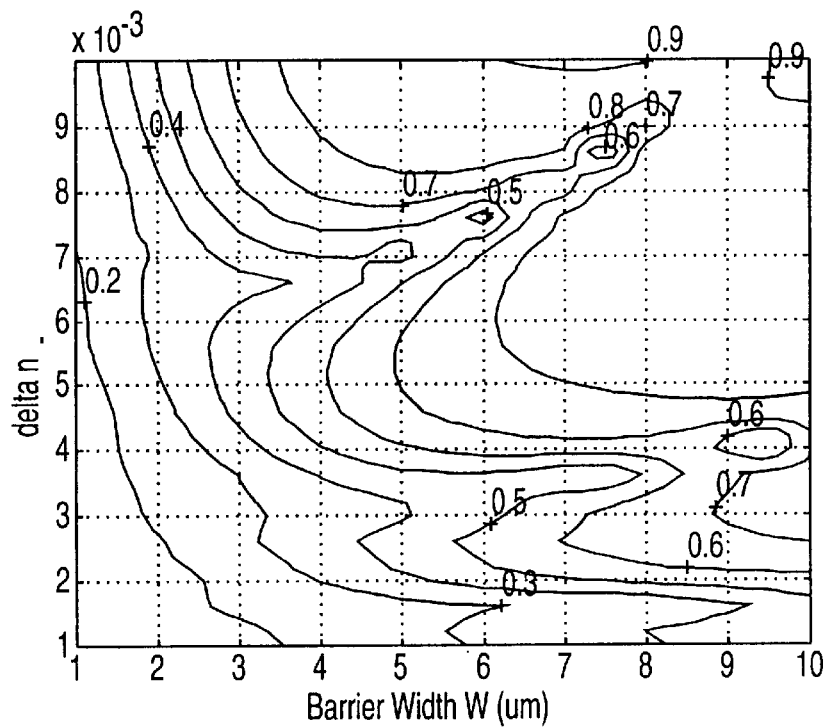
FIG. 3 are contour plots of: 3(a) max($\eta_{1m}$), 3(b) max(m), versus $\Delta n-$ and W for a depressed inner clad fiber having $\lambda_0$=1550 nm, A=5.86 μm, B=62.5 μm, $\Delta n_+$=0.0038, and $n_2$=1.4446.
Figure 3B:
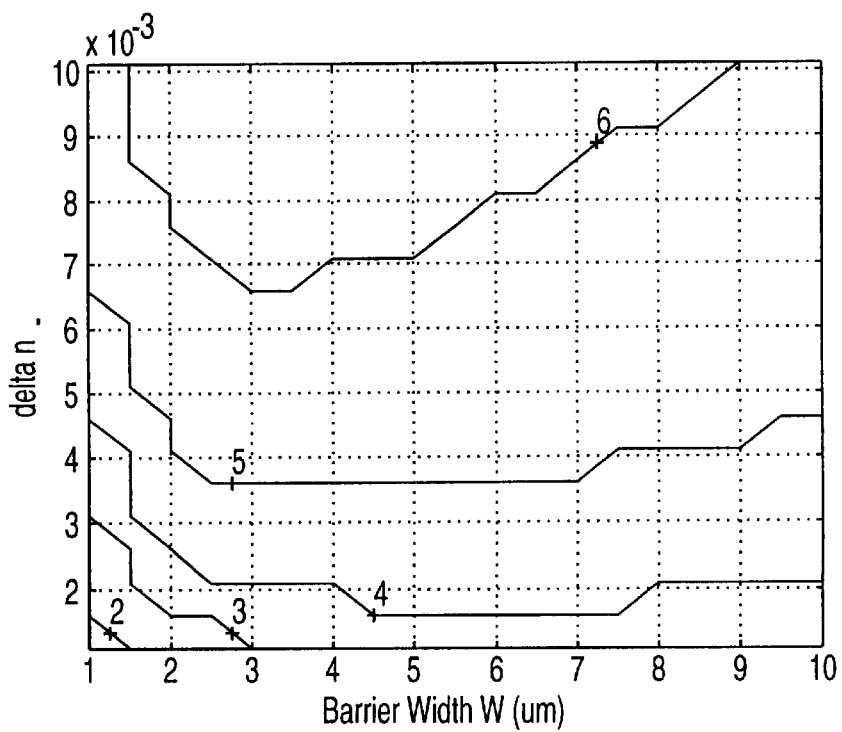

For any two values of $\Delta n-$ and W, $RCC_{1m}$ and $\eta_{1,m}$ values for m=1 to 30 may be calculated using the equations detailed above. These $RCC_{1m}$ and $\eta_{1m}$ values then may be sorted to determine the radial cladding mode numbers, max(m) and max(m'), which have the largest $\eta_{1m}$ ($\max(\eta_{1m})$) and $RCC_{1m}$ ($\max(RCC_{1m})$) values, respectively. FIGS. 3a and 3b are contour plots of $\max(\eta_{1m})$ and max(m) as a function of $\Delta n-$ and W for a particular fiber design example. In this example, at the operating wavelength of 1550 nm, a MFD target was ~10.5 nm and the cutoff wavelength target was 1500 nm. Thus, with $\Delta n-=0$, $B=62.5$ $\mu m$, and $n_2=1.4446$, A was chosen to be 5.86 $\mu m$ and $\Delta n_+(n_1)$ was chosen to be 0.0038 (1.4484). A and $n_1$ are chosen to give a slightly larger MFD and cutoff wavelength than desired with $\Delta n-=0$, with the knowledge that adding a depressed inner cladding will reduce these quantities. Note that at each contour in FIG. 3b, an abrupt change in max(m) to the value identified on the contour occurs. For example, at the point in FIG. 3b where W=4 and $\Delta n-=0.007$, the order for maximum $\eta_{1m}$ changes from 5 for W<4 to 6 for W>4.

FIG. 3a shows that as W and $\Delta n-$ increase, in general, the maximum core confinement factor $(\max(\eta_{1n}))$ increases. The nonmonotonic behavior of $\max(\eta_{1m})$ versus W for a given $\Delta n-$ in this plot is due to the tradeoff of $\max(RCC_{1m})$ between different radial orders. This tradeoff is made more obvious by comparison to FIG. 3b. As W and $\Delta n-$ simultaneously increase from the origin in FIG. 3b, the order with $\eta_{1m}=\max(\eta_{1m})$ assumes the strong core confinement property of the $LP_{11}$ hybrid mode. Typically, when $\max(\eta_{1m})$ exceeds 0.2, we consider the mth L=1 asymmetric cladding mode to be sufficiently confined to the core to have $LP_{11}$ hybrid ghost mode properties.

The second phase of the filter design process is determination of the range of effective tilt angles which give sufficient $LP_{01}-LP_{1m}$ coupling. As defined above, "sufficient coupling" is achieved when two conditions are satisfied:

1. RR>1 for $C_1=1$
2. $\max(RCC_{1m})>0.2$

In a preferred embodiment, RR>3 and $\max(RCC_{1m})>0.25$. The first of these limits assures that the tilt angle is large enough so that in the transmission spectrum for this grating, the depth of the rejection notch due to $LP_{01}-LP_{1m}$ coupling will be greater than the depth of the rejection notch due to $LP_{01}-LP_{01}$ coupling. The second of these limits ensures that the tilt angle is not so large that the rejection notch depth for $LP_{01}-LP_{1m}$ coupling becomes too small to be useful.

RR may be determined from experimental measurements.

$$RR = \frac{R_{1m}}{R_{01}} = \frac{\left(1-10^{\left(\frac{T_{1m}}{10}\right)}\right)}{\left(1-10^{\left(\frac{T_{01}}{10}\right)}\right)}$$

Figure 7A:
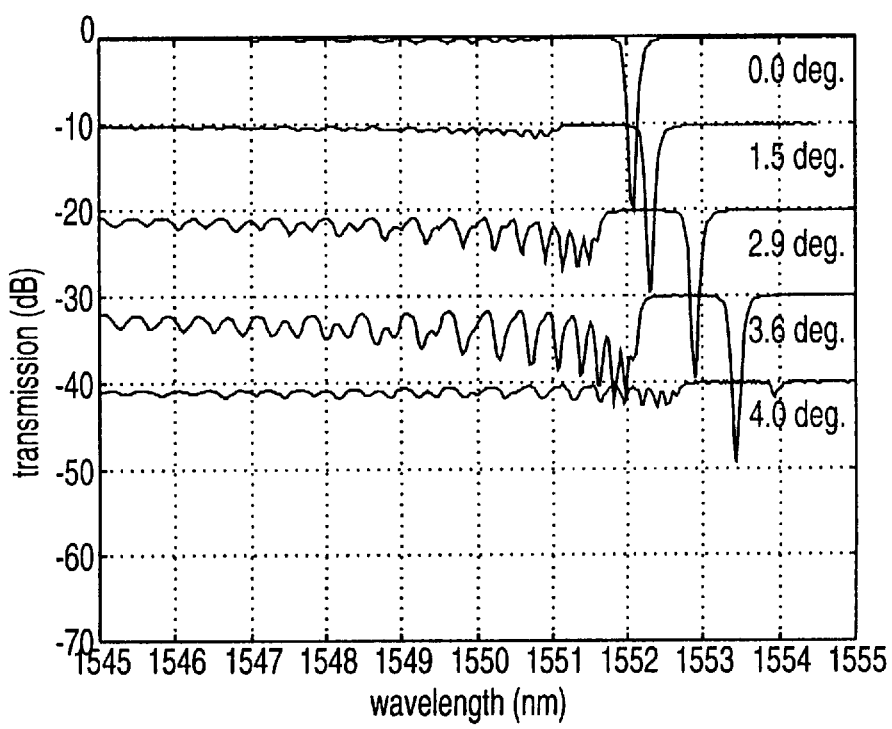
FIG. 7 are graphical plots of the transmission spectra versus wavelength at different grating tilt angles for 7(a) a conventional telecommunications grade single mode matched clad fiber, 7(b) a depressed inner clad (DIC) fiber, and 7(c) a photosensitive matched inner clad (PMIC) fiber. Individual spectra are displaced from nearest neighbors by +/−10 dB for ease in visualization.
Figure 7B:
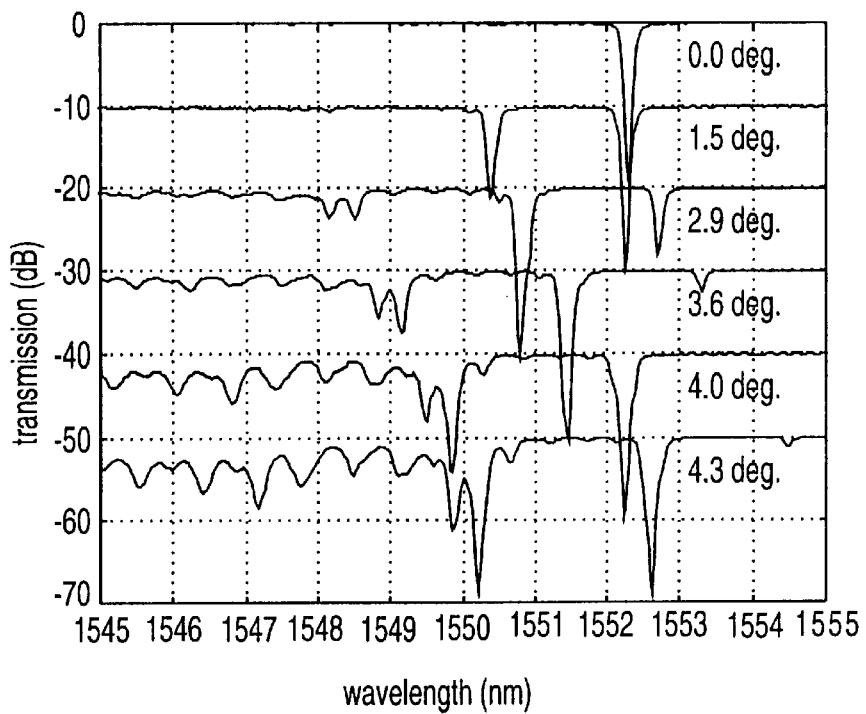

For example, from the 3.6° plot of FIG. 7b, the minimum transmission value for $LP_{01}-LP_{1m}$ coupling, $T_{1m}$, is ~−20 dB, and the minimum transmission value for $LP_{01}-LP_{01}$ coupling, $T_{01}$, is ~−2.5 dB, giving RR~2.26

Figure 4A:
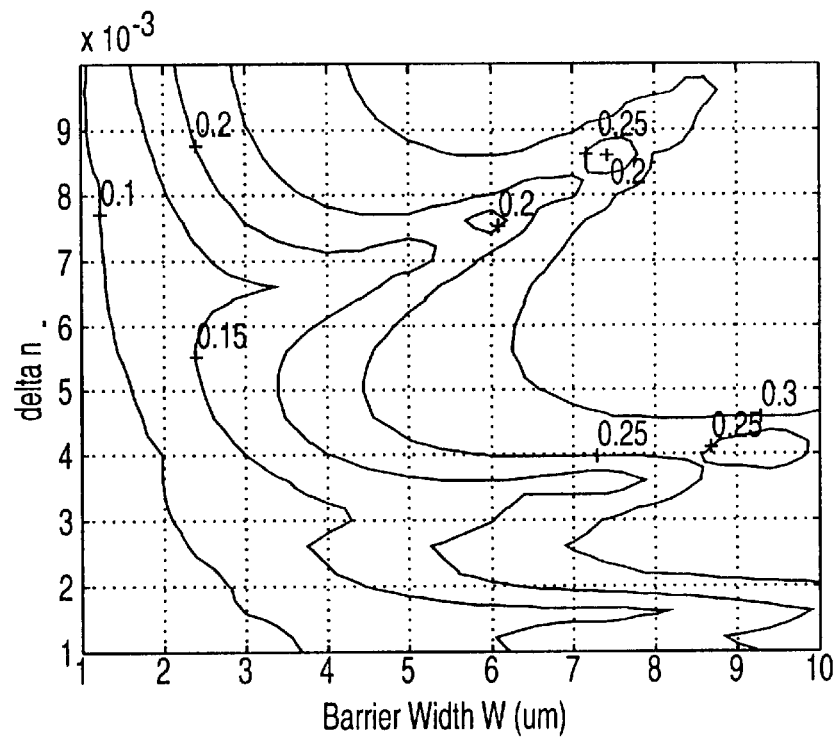
FIG. 4 are contour plots of: 4(a) RR, 4(b) max($RCC_{1m}$), and 4(c) max(m') versus $\Delta n-$ and W for the depressed clad fiber which was the subject of FIG. 3 with $\theta$=1° and m=1 to 30.
Figure 4B:
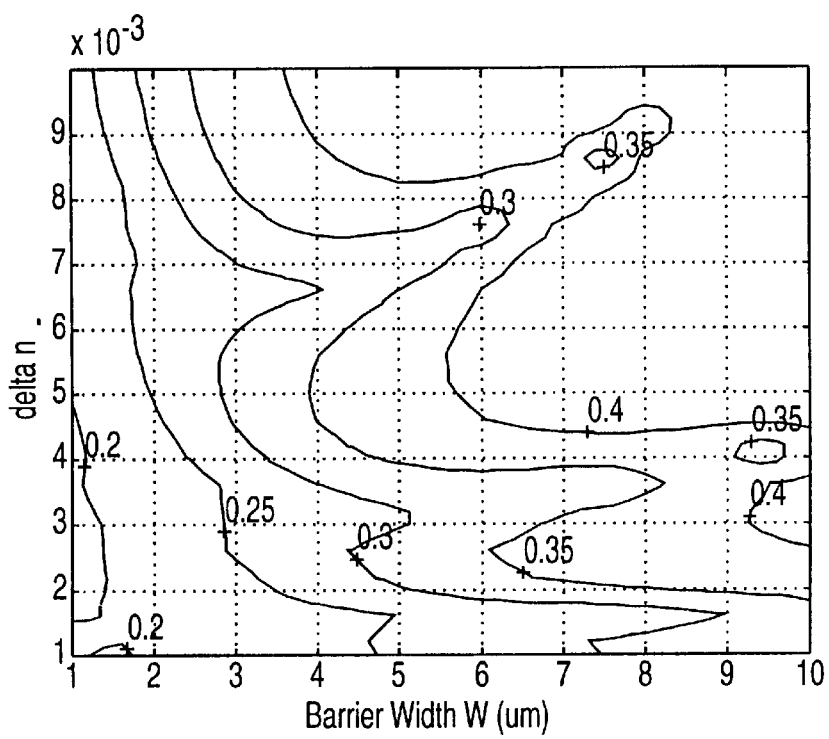
Figure 4C:
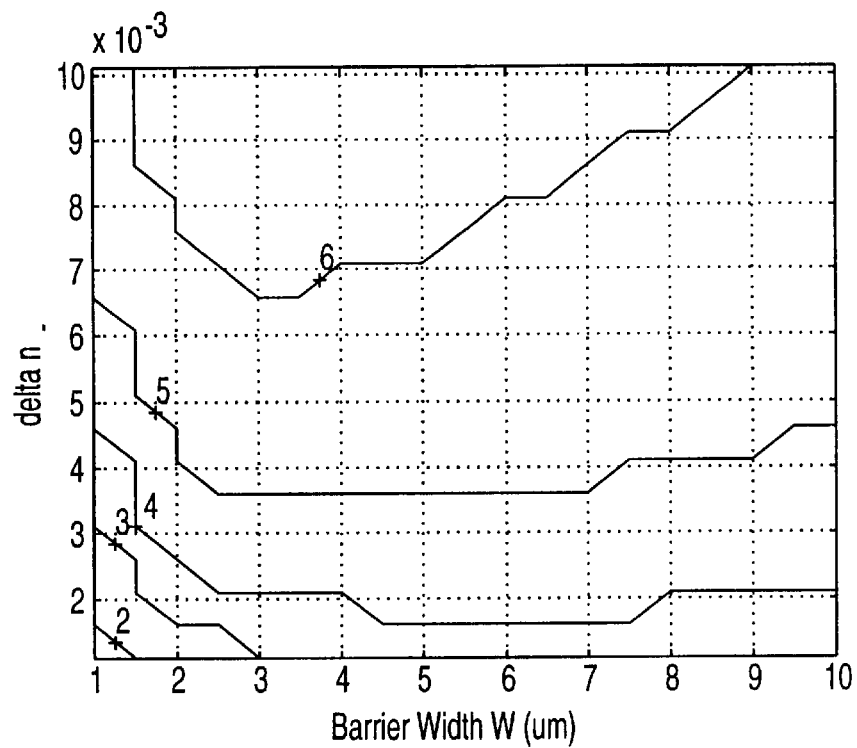

As an example, FIGS. 4a–c are plots of RR, max $(RCC_{1m})$, and max(m') versus W and $\Delta n-$ for $\theta=1°$. FIG. 5 are contour plots of (a) RR, (b) $\max(RCC_{1m})$, and (c) max(m') versus $\Delta n-$ and W for the depressed clad fiber which was the subject of FIG. 3 with $\theta=3°$ and m=1 to 30. FIG. 6 are contour plots of (a) RR, (b) $\max(RCC_{1m})$, and (c) max(m') versus $\Delta n-$ and W for the depressed clad fiber of which was the subject of FIG. 3 with $\theta=5°$ and m=1 to 30.

Figure 5A:
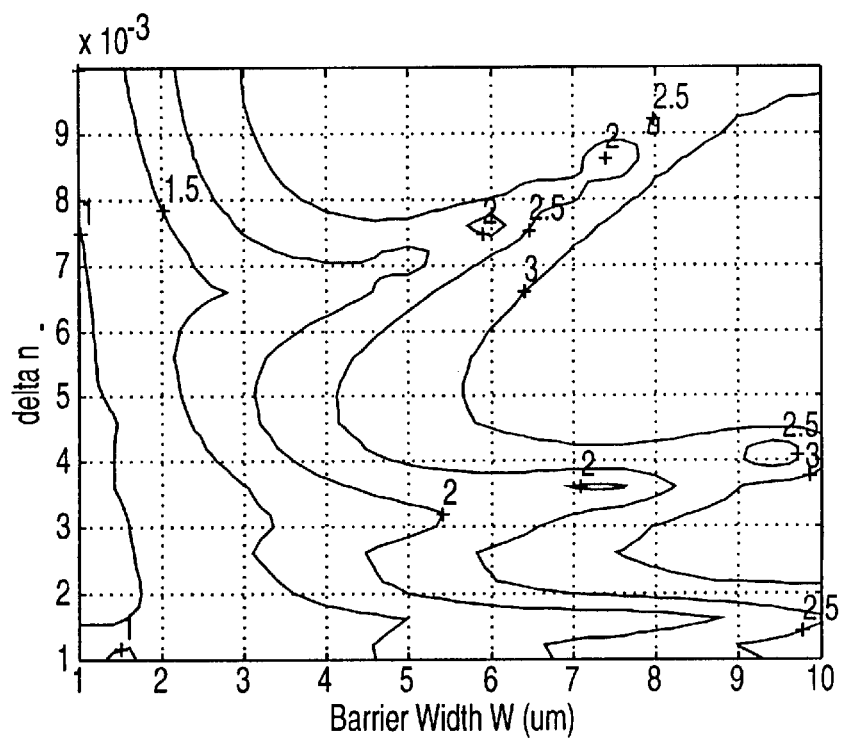
FIG. 5 are contour plots of: 5(a) RR, 5(b) max($RCC_{1m}$), and 5(c) max(m') versus $\Delta n-$ and W for the depressed clad fiber which was the subject of FIG. 3 with $\theta$=3° and m=1 to 30.
Figure 5B:
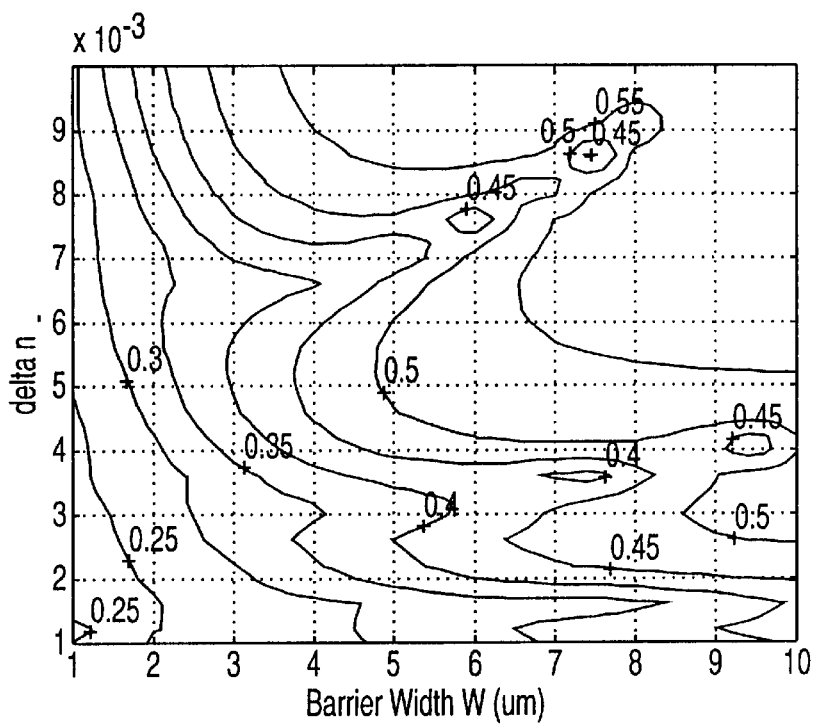
Figure 5C:
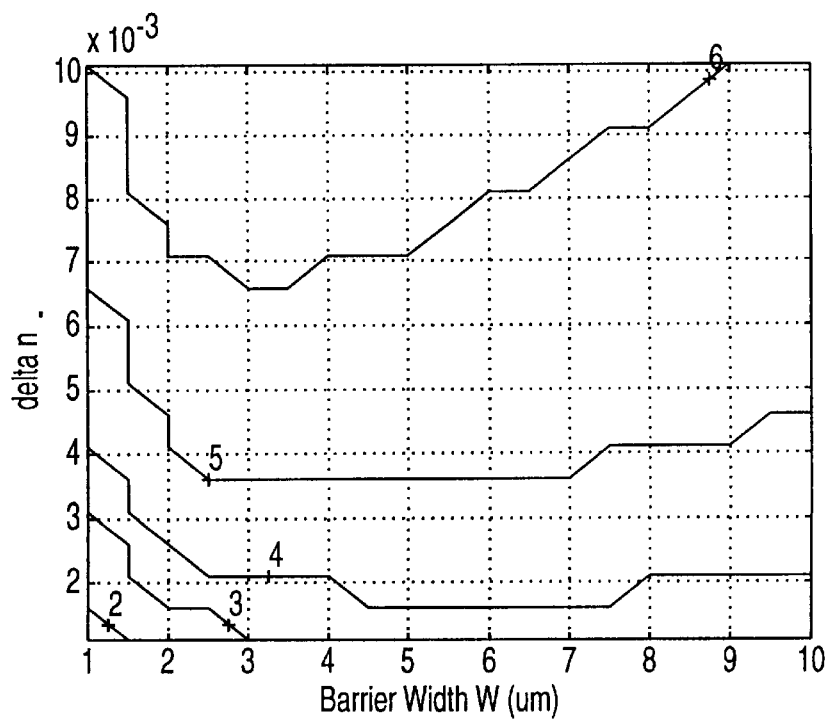
Figure 6A:
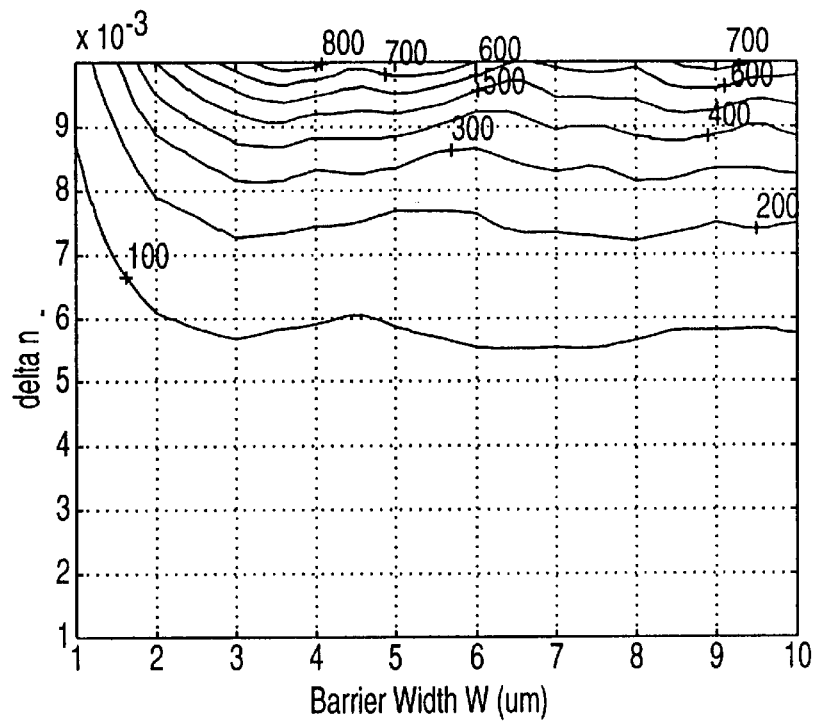
FIG. 6 are contour plots of: 6(a) RR, 6(b) max($RCC_{1m}$), and 6(c) max(m') versus $\Delta n-$ and W for the depressed clad fiber of which was the subject of FIG. 3 with $\theta$=5° and m=1 to 30.
Figure 6B:
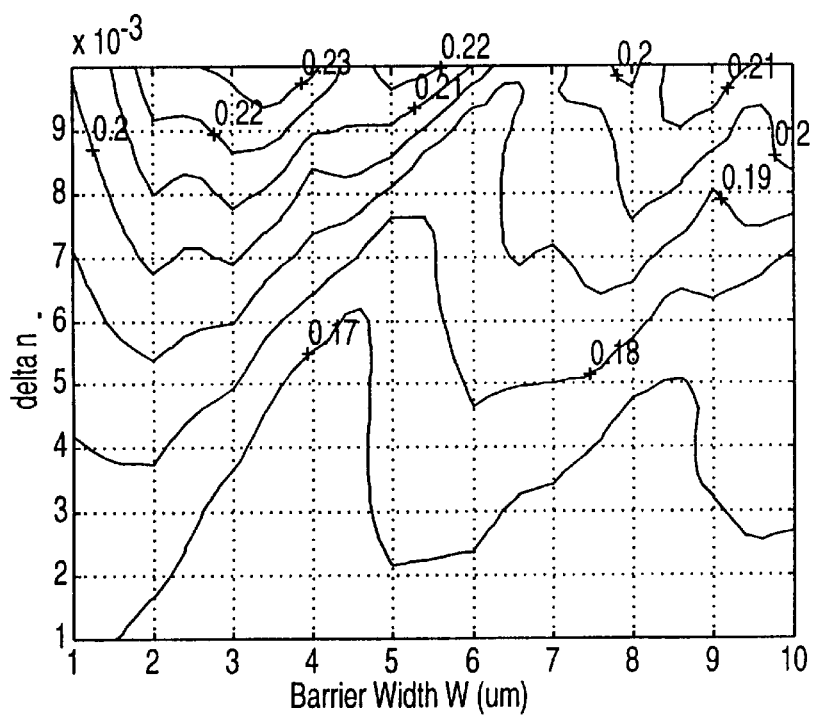
Figure 6C:
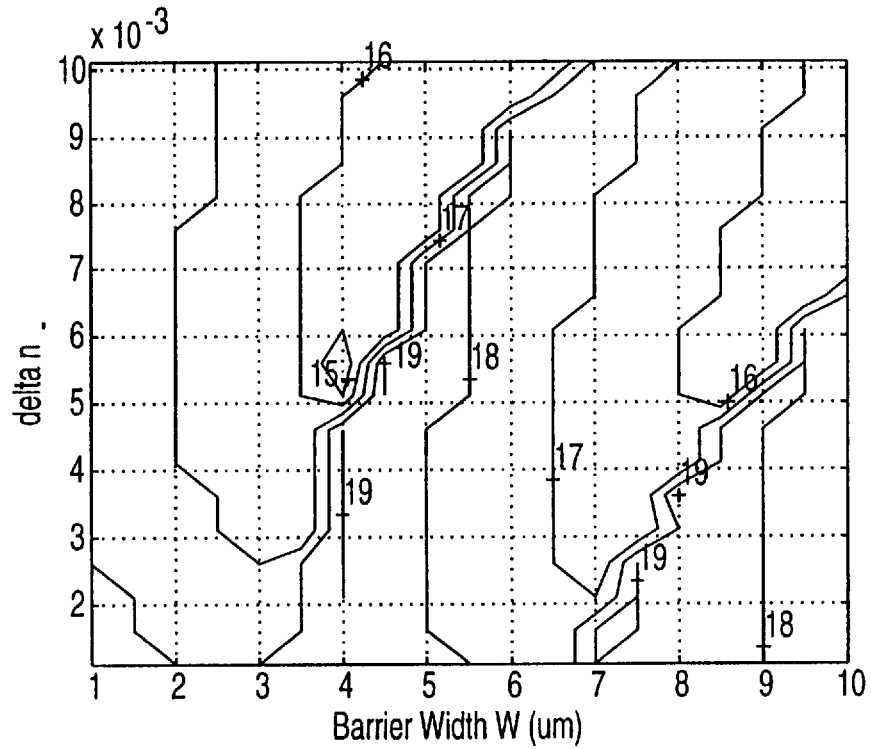

From these plots, we see that the condition of RR>3.0 and $\max(RCC_{1m})>0.2$ are met simultaneously in the $\theta=3°$ and $\theta=5°$ case (FIGS. 5a and 6a–b). These plots show that the region of $W/\Delta n-$ space where RR peaks is relatively insensitive to $\theta$, this region being relatively well characterized by setting a limit on the core confinement factor $\max(\eta_{1m})$ which is not dependent on $\theta$.

Using the plots and the sufficient coupling criteria, values of W and $\Delta n-$ are selected for a particular set of operating conditions and fiber design conventions. For conventional telecommunication fiber for operation at 1550 nm, an embodiment of a filter in accordance with the present invention is found at W>0.6 A and $\Delta n->0.003$ to give core confinement factors $(\max(\eta_{1m}))>0.2$, and $1°<\theta<10°$ to satisfy the RR and $\max(RCC_{1m})$ requirements.

An embodiment of the present invention comprises a DIC fiber having 1250 nm<$\lambda_0$<1600 nm, B~62.5 $\mu m$, 1200 nm<$\lambda_c$<1600 nm, 4 $\mu m$<MFD<13 $\mu m$, W>0.6 A, $\Delta n->0.003$. A particularly embodiment further exhibits the following values: $0.003<\Delta n_+<0.012$ and 2 $\mu m$<A<8 $\mu m$. Another embodiment includes a DIC fiber having 800nm<$\lambda_0$<1000 nm, B~62.5 $\mu m$, 800 nm<$\lambda_c$<1600 nm, 2 $\mu m$<MFD<30 $\mu m$, W>0.6 A, $\Delta n->0.003$. A further embodiment further has $0.003<\Delta n_+<0.012$ and 1 $\mu m$<A<8 $\mu m$.

In alternative embodiments $1°<\theta<10°$ and the grating may comprises a chirped grating.

The fiber design process for a PMIC fiber in accordance with the present invention is similar to the DIC fiber design process. As before, the desired operating wavelength of the filter ($\lambda_o$), the cladding radius (B), and the target mode field diameter (MFD) are known or are determined based on the requirements of the system to which the filter will be coupled. It is generally desired to have the second mode cutoff wavelength ($\lambda_c$) to be close to, but less than, the operating wavelength. In optical fibers, $n_2 \approx n_{silica}$ at the design wavelength. These constraints on the fiber design limit the allowed values of A, and $n_1$. Thus, the two fiber parameters for PMIC and PDIC fibers that are determined through the fiber design process are $R_{grat}$ and $\gamma$.

The PMIC filter of the present invention operates by coupling to a strongly bound, but leaky $LP_{1m}$ cladding mode. Accordingly, the value of $n_{ext}$ is not crucial for the operation of the fiber and grating combination. However, in the fiber design process, $n_{ext}$ is selected to be smaller than $n_2$ by an amount sufficient to allow the existence of greater than 30 $LP_{1m}$ cladding modes. For purposes of comparing to measurements made in air before fiber recoating, a value of $n_{ext}=1$ is chosen.

For any two values of $R_{grat}$ and $\gamma$, $RCC_{1m}$ and $\eta_{1,m}$ values for m=1 to 30 may be calculated using the equations detailed above. The $RCC_{1m}$ and $\eta_{1m}$ values then may be sorted to determine the radial cladding mode numbers, max(m) and max(m'), which have the largest $\eta_{1m}$ ($\max(\eta_{1m})$) and $RCC_{1m}$ ($\max(RCC_{1m})$) values, respectively. These values may then be plotted versus effective grating tilt angle in a manner similar to the plots of FIGS. 4–6. Limits on $R_{grat}$ and $\gamma$ are achieved in a preferred embodiment by forcing RR>3 and $\max(RCC_{1m})>0.2$.

An embodiment of the present invention includes a PMIC fiber having 1250 nm<$\lambda_0$<1600 nm, B~62.5 $\mu m$, 1200nm<$\lambda_c$<1600 nm, 4 $\mu$m<MFD<13 $\mu$m, $\Delta$n-=0, $R_{grat}$>1.5 A, and $\gamma$>0.5. A particular embodiment further exhibits the following values: 0.003<$\Delta n_+$<0.012 and 2 $\mu$m<A<8 $\mu$m. Another embodiment includes a PMIC fiber having 800 nm<$\lambda_0$<1000 nm, B~62.5 $\mu$m, 800 nm<$\lambda_c$<1600 nm, 2 $\mu$m<MFD<30 $\mu$m, $\Delta$n-=0, $R_{grat}$>1.5 A, and $\gamma$>0.5. A further embodiment further has 0.003<$\Delta n_+$<0.012 and 1 $\mu$m<A<8 $\mu$m.

Finally, yet another embodiment of the present invention includes a PDIC fiber having 1250 nm<$\lambda_0$<1600 nm, B~62.5 $\mu$m, W>0.6 A, $\Delta$n->0.003, $R_{grat}$>1.5 A, $\gamma$>0.5, 4 $\mu$m<MFD<13 $\mu$m, 0.003<$\Delta n_+$<0.012, and 2 $\mu$m<A<8 $\mu$m. In another PDIC fiber embodiment, 800 nm <$\lambda_0$<1000 nm, B~62.5 $\mu$m, W>0.6 A, $\Delta$n->0.003, $R_{grat}$>1.5 A, $\gamma$>0.5, 2 $\mu$m<MFD<30 $\mu$m, 0.003<$\Delta n_+$<0.012, and 1 $\mu$m<A<8 $\mu$m.

EXAMPLES

For the DIC design ($\Delta n_->0.003$ and W>0.6 A) and the PMIC design ($R_{grat}$>1.5 A and $\gamma$>0.5) gratings were written as a function of tilt angle in three fibers having $\lambda_0$=1550 nm, $n_{clad}$=1.4446, $n_{ext}$=1.0, and B=62.5 $\mu$m. The three fibers included: 1) A conventional matched clad (MC) telecommunications grade fiber (such as SMF-28 from Corning, Inc., Corning, N.Y.) having A~4.15 $\mu$m, MFD~10.5 $\mu$m, $\Delta n_+$~0.0046, 2) a wide, moderately deep depressed clad (DIC) fiber having A=5.86 $\mu$m, W=3.85 $\mu$m (AB=9.71 $\mu$m), $\Delta$n+=0.0038, $\Delta$n-=0.0064 and a MFD=9.5 $\mu$m, and 3) a photosensitive matched inner cladding (PMIC) fiber having A=4.7 $\mu$m, $\Delta$n+=0.0052, $R_{grat}$=9.4 $\mu$m, $\gamma$~1.0, and a MFD= 10.1 $\mu$m. The gratings written were 15 mm in length, unapodized, and the spectra were measured after recoating ($n_{ext}$~$n_2$). The gratings were written in the fibers using sidewriting phase mask exposure technique. The gratings were written using an excimer laser at 248 nm with a total dose sufficient to give -20 dB losses in transmission for the first rejection band to reach that value of rejection.

A variable tilt angle was achieved by orienting the phase mask rulings at an angle of 90°+$\theta$/$n_2$ from the fiber axis. Note that the factor of 1/$n_2$ is included as a first order correction to the bending of the fringes in the fiber core due to the cylindrical symmetry of the fiber in the small angle and small core approximation ($\theta$<10°, A<<B).

Figure 7C:
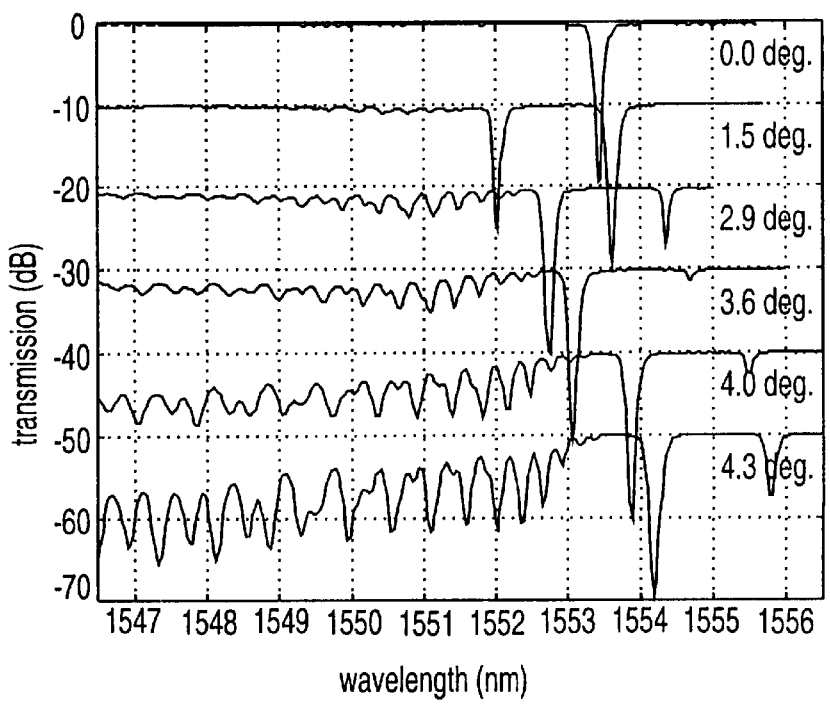

Transmission spectra for gratings written in these two fibers as a function of the tilt of the grating fringes with respect to the fiber normal ($\theta$) are plotted in FIG. 7a (MC fiber), FIG. 7b (DIC fiber), and FIG. 7c (PMIC fiber). The spectra for different angles are displaced by -10 dB on the vertical axis with respect to the next closest angle for ease in viewing. As indicated by the legend for the plots, the spectra corresponding to $\theta$=0°, 1.5°, 2.9°, 3.6°, 4.0°, and 4.3° are displayed in descending order on the plots. Note that lack of photosensitivity limited the strength of the transmission notches that could achieved in the MC fiber for $\theta \geq 4°$.

The evolution of the rejection notches as a function of increasing tilt angle is markedly different for the DIC and PMIC fiber types as compared to the MC fiber type. While all three fiber types exhibit similar fundamental rejection notches for $\theta$=0°, and exhibit shifting of the fundamental notch to higher wavelengths and weakening as the grating tilt increases, the cladding mode structure evident for the MC fiber (FIG. 7a) is much less peaked than the structure for the DIC fiber (FIG. 7b). In particular, as the tilt increases in FIG. 7b, note the emergence of a strong, localized rejection notch due to strong coupling of the forward propagating $LP_{01}$ core mode to the counter-propagating $LP_{11}$-hybrid cladding mode (the $LP_{1m}$ cladding mode with max ($RCC_{1m}$)). At tilt angles exceeding ~2° in this figure, the strength of the $LP_{11}$-hybrid rejection notch exceeds that of the fundamental rejection notch, due to coupling of the forward propagating $LP_{01}$ core mode to the counterpropagating $LP_{01}$ core mode and nearly complete suppression of the fundamental notch occurs for $\theta$~4°. The evolution of the transmission spectra versus $\theta$ is similar for the PMIC fiber design of FIG. 7c.

To illustrate the properties of a preferred fiber design for the DIC fiber filter, a value of $\theta$=4° was chosen to give nearly complete suppression of the coupling of the forward propagating $LP_{01}$ core mode to the counterpropagating $LP_{01}$ core mode in the depressed clad fiber detailed above.

Figure 8A:
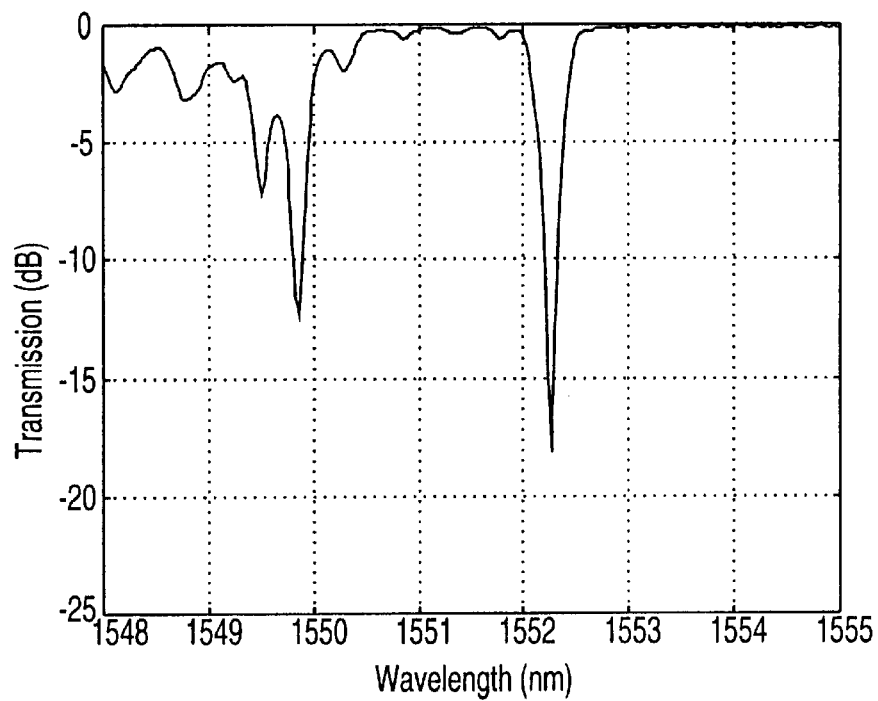
FIGS. 8(a)–(c) are graphical plots having different axial limits of the transmission spectrum versus wavelength for DIC fiber for in fiber fringe tilt of $\theta$~4.0°.
Figure 8B:
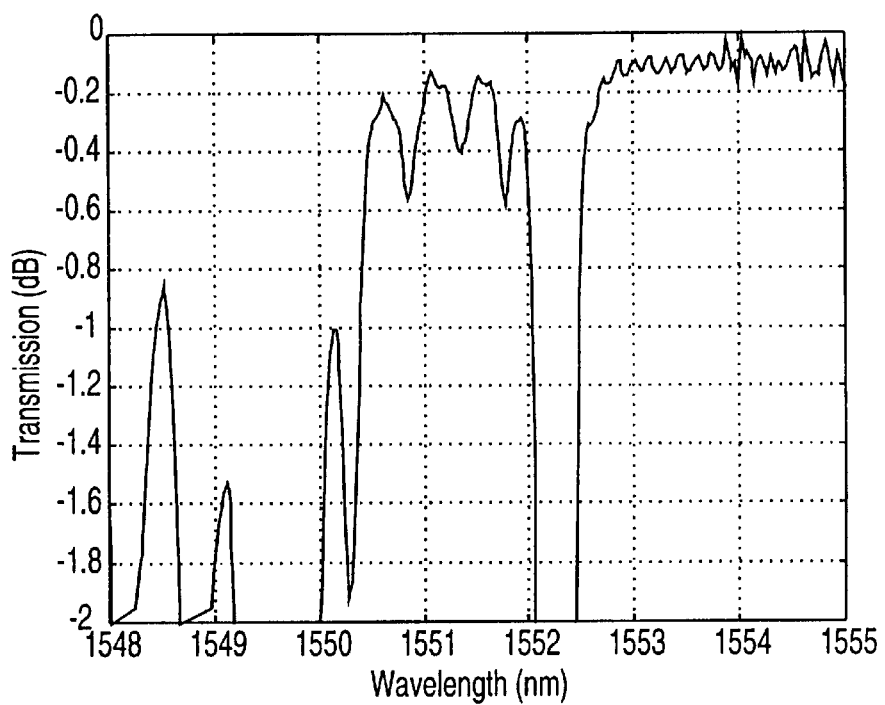
Figure 8C:
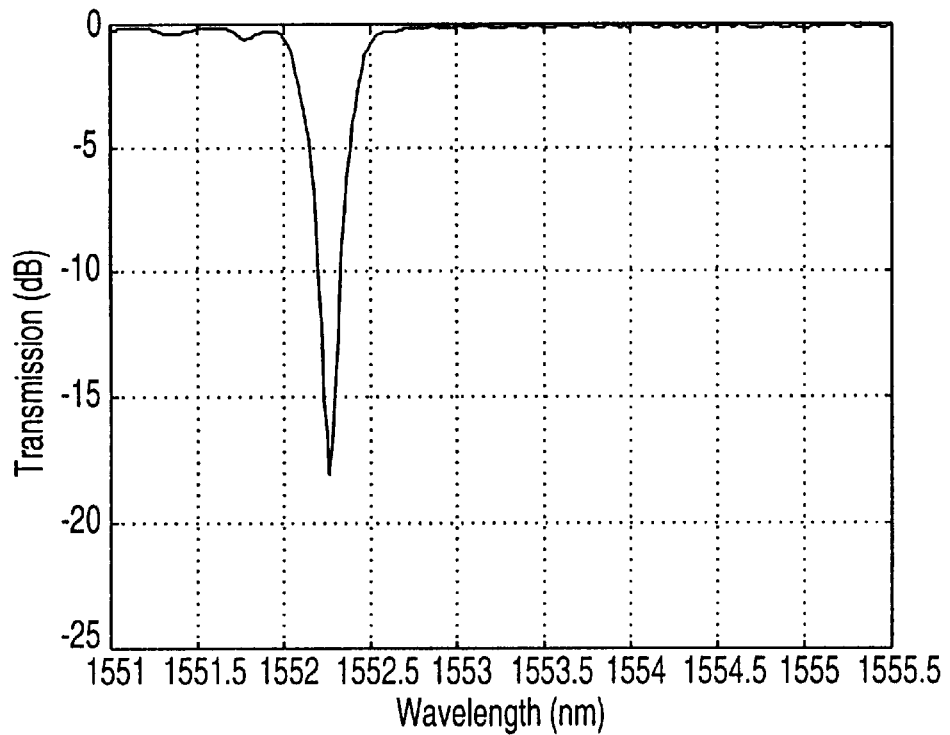
Figure 9:
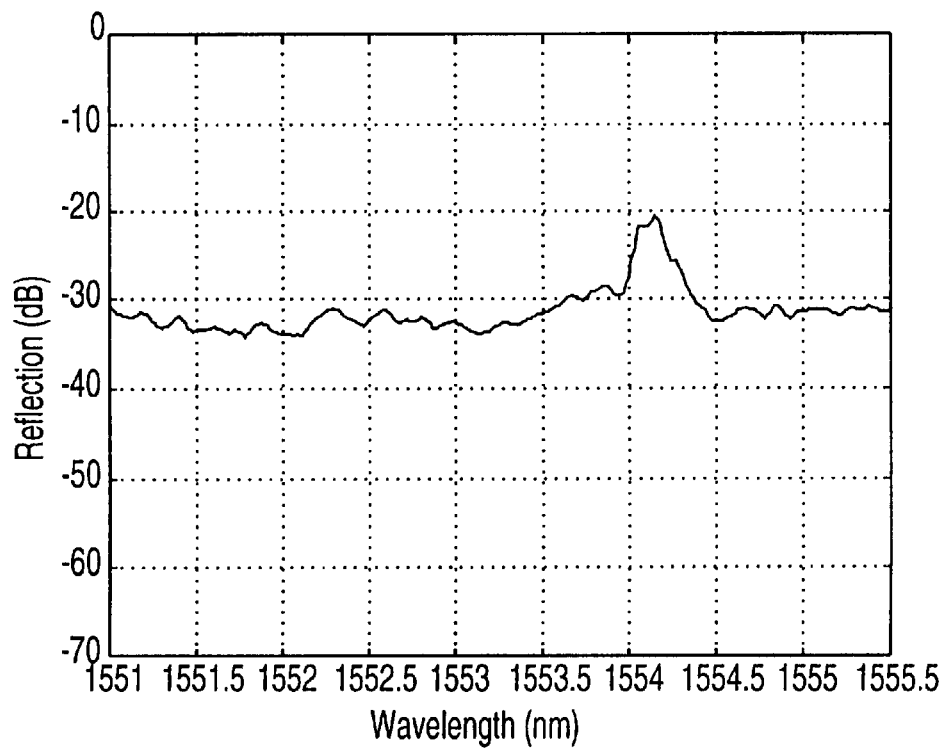

FIG. 8a is a transmission spectrum for this grating over a large wavelength range. The transmission minimum due to the $LP_{01}$-$LP_{01}$ coupling is not visible in this figure, but a strong transmission minimum is observed at $\lambda$~1552.2 nm due to $LP_{01}$-$LP_{11}$ hybrid mode coupling. The careful choice of tilt angle (4°) has given nearly complete suppression of $LP_{01}$-$LP_{01}$ coupling this fiber. FIG. 8b is a similar plot but with an expanded vertical scale. On this plot, the transmission minimum due to $LP_{01}$-$LP_{01}$ coupling is not obvious at a wavelength of just greater than 1554 nm. Although significant coupling to other higher order cladding modes is observed in FIGS. 8a and 8b for $\lambda$<1550 nm, the passband (~2 nm in this example) between the higher order and the $LP_{01}$-$LP_{1m}$ loss notches allows for the application of this device in some bandpass filter applications. This passband is not present for a matched clad fiber design and, while present, the passband is not as large for the PMIC fiber design FIG. 8c illustrates the same information as FIG. 8a, but has a scaled horizontal axis. FIG. 9 shows the corresponding reflection spectrum. This spectrum was calibrated using the signal reflected from a cleaved endface (Fresnel reflection) as a reference. Note from this figure that the reflection of the $LP_{01}$-$LP_{01}$ coupling resonance is suppressed by at least -20 dB. However, the rejection mode (due to $LP_{01}$-$LP_{11}$ hybrid mode coupling) has suppression of at least -32 dB, a significant performance improvement. The present invention accordingly offer effectively complete suppression of reflection in the rejection band.

From FIG. 7c it may be noted that a PMIC fiber design can achieve similar rejection performance for the appropriately tuned angle, but with a smaller passband to shorter wavelengths. Additionally, it may be noted that while the spectra of FIGS. 8 and 9 have been obtained from an unchirped grating, the width of the rejection notch may be increased by chirping the grating.

The present invention may be included in a variety of different lightwave systems. Three exemplary applications are:

1. Bandpass filtering
2. Test signal suppressor (dropping)
3. Gain flattening

Figure 11:
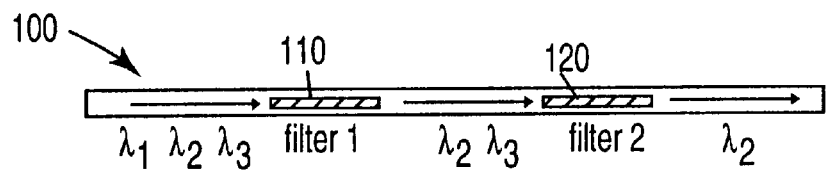
FIG. 11 is a simplified schematic view of a bandpass filter in accordance with the present invention.

A bandpass filter 100 in accordance with the present invention is illustrated in FIG. 11. The bandpass filter includes two cascading filters, 110 and 112, with spectra similar to that of FIG. 8, but different peak rejection wavelengths. Each filter has a grating as described above. A signal including wavelengths $\lambda_1$, $\lambda_2$, and $\lambda_3$ is introduced in the bandpass filter, where $\lambda_1$<$\lambda_2$<$\lambda_3$. $\lambda_2$ lies in the passband between rejection notches for $\lambda_1$ and $\lambda_3$. The filters 110 and 112 are designed to drop $\lambda_1$ and $\lambda_3$, respectively, to allow only the filtered signal having a wavelength $\lambda_2$.

Figure 10A:
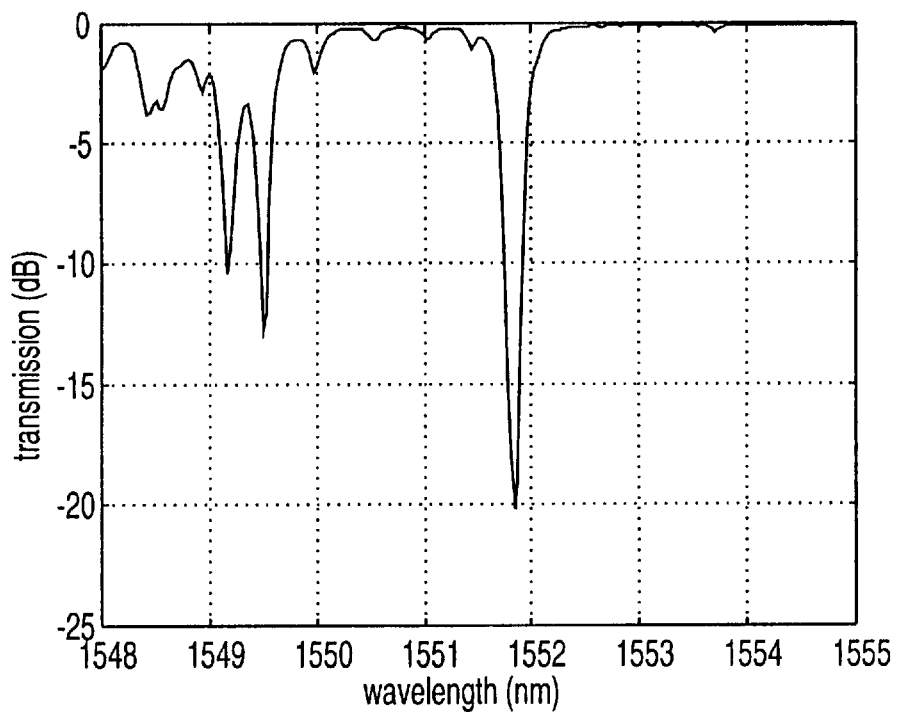
FIG. 10(a) is a graphical plot of the transmission spectrum for the DIC fiber for in fiber fringe tilt of $\theta$~4.0° having grating geometry and exposure conditions similar to the grating in FIG. 7b.
Figure 10B:
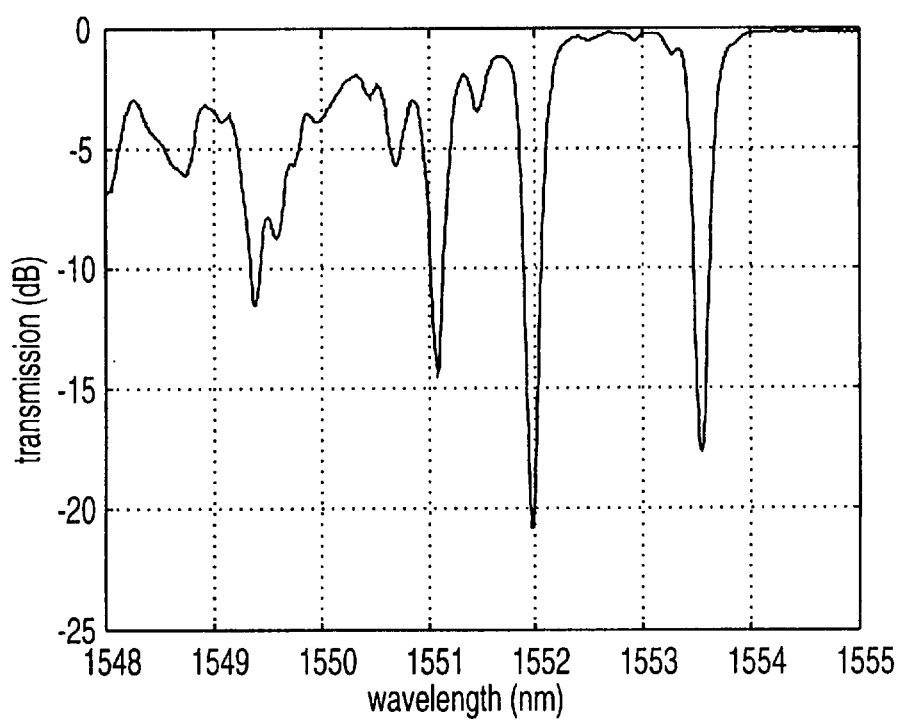
FIG. 10(b) is a graphical plot of transmission when the grating of FIG. 10(a) is cascaded with the grating of FIG. 7(b).

The usable bandwidth of the bandpass is limited by the flat region between the max($LP_{1m}$) peak and the subsidiary cladding mode peaks to the shorter wavelength side. For example, for the filter of FIG. 8b, the usable bandwidth to shorter wavelengths is approximately 2 nm. FIGS. 8a and 10a illustrate transmission spectra for individual gratings that can be combined, under appropriate tensioning, to give a bandpass filter for use in a system with a channel spacing of approximately 100 GHz (0.8 nm). FIG. 10b illustrates the transmission spectrum for the two grating cascade, which exhibits a desired bandpass structure.

Figure 12:
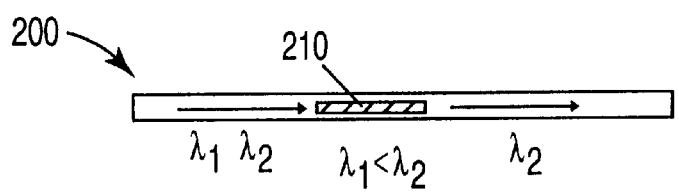
FIG. 12 is a simplified schematic view of a test signal suppressor in accordance with the present invention.

A test signal suppressor 200 is illustrated in FIG. 12. The suppressor includes one filter 210 of the type shown in FIG. 8. A signal including a plurality of wavelengths is introduced into the suppressor 200. The wavelength to be dropped, $\lambda_1$, lies to shorter wavelengths from the wavelengths, $\lambda_2$, to be passed. $\lambda_2$ lies in the spectral region transmitted by the filter with low loss. $\lambda_1$, which is the test signal, lies in the spectral region with high transmission loss.

Using the spectrum of FIG. 8c as an example, large rejection with negligible back reflection is accomplished at the center wavelength of the filter (~1552.2 nm), while negligible attenuation occurs to higher wavelengths. The filter is designed so that the signal to be suppressed occurs at the center wavelength of the filter, to obtain the desired test signal suppression functions.

Figure 13:
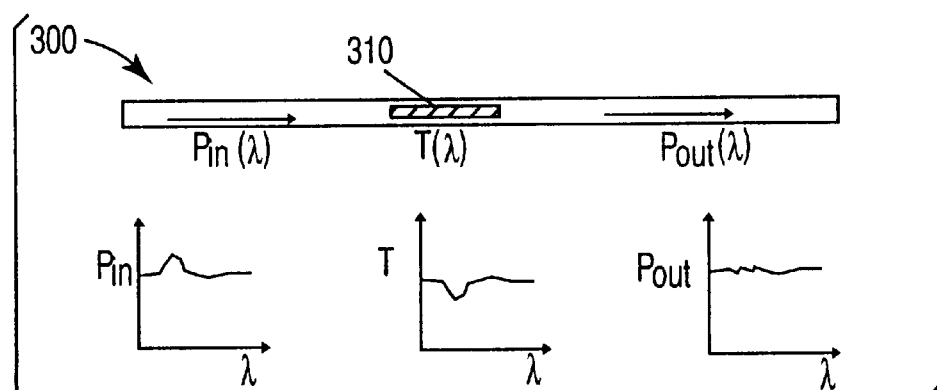
FIG. 13 is a simplified schematic view of a spectral power flattener in accordance with the present invention.

A gain or spectral power flattener 300 in accordance with the present invention is illustrated in FIG. 13. An input signal with varying power as a function of wavelength is flattened after transmission through a filter 310 of the appropriate design. Gain flattening is accomplished by shortening the grating length or chirping the grating period of a filter in accordance with the present invention.

Additionally, the filter described above may be tuned, either in strength, center rejection wavelength, or other optical properties, through optical, mechanical, thermal, electrical, or other means to form tunable, reconfigurable, or switchable filters.

Those skilled in the art will appreciate that other waveguides having different geometries and parameters may be used to manufacture filters and a variety of lightwave systems in accordance with the present invention. While the present invention has been described with a reference to exemplary preferred embodiments, the invention may be embodied in other specific forms without departing from the spirit of the invention. Accordingly, it should be understood that the embodiments described and illustrated herein are only exemplary and should not be considered as limiting the scope of the present invention. Other variations and modifications may be made in accordance with the spirit and scope of the present invention.

What is claimed is:

1. An optical fiber filter comprising:
   a length of single mode fiber having an operating wavelength $\lambda_0$, the length of fiber including:
   a core having an index of refraction $n_{co}$ and a radius A, wherein the core has an $LP_{01}$ core mode having an effective index of $n_{eff,01}$,
   an inner cladding generally laterally surrounding the core, the inner cladding having an index of refraction $n_{ic}$, an inner radius A, and an outer radius AB,
   an outer cladding generally laterally surrounding the inner cladding, the outer cladding having an inner radius AB, an outer radius B, and an index of refraction $n_{oc}$, where $\Delta n_+$ is the difference between $n_{co}$ and $n_{oc}$, the cladding allowing the existence of a $LP_{1m}$ cladding mode,
   an azimuthally asymmetric grating having an effective tilt angle $\theta$ and a period ($\Lambda$), where $\Lambda \leq (\lambda_0 \cos \theta)/(2n_{eff,01})$;

wherein the maximum relative coupling coefficient for the cladding mode
   $\max(RCC_{1m})$ is greater or equal to 0.2 and the ratio of peak reflectivities for the cladding mode and the core mode RR is greater or equal to 1.

2. The filter of claim 1, wherein the fiber is a depressed inner clad fiber and wherein the inner cladding has a thickness W, where W=AB−A, and $\Delta n-$ is the difference between $n_{ic}$ and $n_{oc}$ and $n_{co} > n_{oc} > n_{ic}$, the values of $\Delta n_+$, $\Delta n-$, and W allowing the existence of the $LP_{1m}$ cladding mode, wherein $m \geq 1$.

3. The filter of claim 2, wherein the fiber is a photosensitive depressed inner clad fiber comprising a photosensitive region extending to a radius $R_{grat}$, the photosensitive region having a fractional photosensitivity $\gamma$.

4. The filter of claim 3, where 1250 nm<$\lambda_0$<1600 nm, B≈62.5 µm, W>0.6 A, $\Delta n->0.003$, $R_{grat}>1.5$ A, $\gamma>0.5$, 4 µm<MFD<13 µm, 0.003<$\Delta n_+$<0.012, and 2 µm<Λ<8 µm.

5. The filter of claim 3, where 800 nm<$\lambda_0$<1000 nm, B≈62.5 µm, W>0.6 A, $\Delta n->0.003$, $R_{grat}>1.5$ A, $\gamma>0.5$, 2 µm<MFD<30 µm, 0.003<$\Delta n\_$<0.012, and 1 µm<Λ<8 µm.

6. The filter of claim 2, wherein the inner cladding is non-photosensitive.

7. The filter of claim 2, wherein 1250 nm<$\lambda_0$<1600 nm, B≈62.5 µm, W>0.6 A, $\Delta n->0.003$, the fiber having a mode field diameter MFD, where 4 µm<MFD<13 µm.

8. The filter of claim 7, where 0.003<$\Delta n+$<0.012 and 2 µm<Λ<8 µm.

9. The filter of claim 2, wherein 800 nm<$\lambda_0$<1000 nm, B≈62.5 µm, W>0.6 A, $\Delta n->0.003$, the fiber having a mode field diameter MFD, where 2 µm<MFD<30 µm.

10. The filter of claim 9, where 0.003<$\Delta n+$<0.012 and 1 µm<Λ<8 µm.

11. The filter of claim 1, wherein the fiber is a photosensitive matched inner clad fiber, wherein the inner cladding comprises a photosensitive region, said inner cladding being photosensitive to a radius $R_{grat}$ and having a fractional photosensitivity $\gamma$.

12. The filter of claim 11, where 1250 nm<$\lambda_0$<1600 nm, B≈62.5 µm, $\Delta n-=0$, $R_{grat}>1.5$ A, $\gamma>0.5$, 4 µm<MFD<13 µm, 0.003<$\Delta n_+$<0.012, and 2 >µm<Λ<8 µm.

13. The filter of claim 11, where 800 nm<$\lambda_0$<1000 nm, B≈62.5 µm, $\Delta n-=0$, $R_{grat}>1.5$ A, $\gamma>0.5$, 2 µm<MFD<30 µm, 0.003<$\Delta n_+$<0.012, and 1 µm<Λ<8 µm.

14. The filter of claim 1, wherein RR$\geq$3.

15. The filter of claim 1, wherein 1°<$\theta$<10°.

16. The filter of claim 1, wherein the grating comprises a chirped grating.

17. A bandpass filter including the filter of claim 1.

18. A test signal suppressor including the filter of claim 1.

19. A gain flattening device including the filter of claim 1.

* * * * *